United States Patent Office 2,760,954
Patented Aug. 28, 1956

2,760,954

INTERPOLYMERS OF 1,2-DIMETHOXYETHYLENE AND MALEIC ANHYDRIDE

Marcus A. Naylor, Jr., Wilmington, Del., assignor to E. I. du Pont de Nemours and Company, Wilmington, Del., a corporation of Delaware No Drawing. Application March 25, 1954,
Serial No. 418,765

2 Claims. (Cl. 260—78.5)

This invention relates to interpolymers of 1,2-dimethoxyethylene and more particularly to dimethoxyethylene/maleic anhydride interpolymers.

Monomeric 1,2-dimethoxyethylene was first prepared several years ago (U. S. Patent 2,479,068, issued 8–16–49 to William F. Gresham) and the polymerization of this monomeric material in the present of certain ionic and free radical type catalysts has been observed (cf. U. S. 2,526,743, issued 11–24–50 to W. F. Gresham). Interpolymers of 1,2-dimethoxyethylene with vinyl compounds and dienes also have been disclosed (U. S. Patent 2,479,068).

Heretofore it was not known, however, that dimethoxyethylene could be interpolymerized with materials which were not of the vinyl type; more particularly it was not known that dimethoxyethylene could be interpolymerized with maleic anhydride or other alkenedioic type compounds.

It has been discovered in accordance with this invention that 1,2-dimethoxyethylene is capable of interpolymerization with alkenedioic compounds such as maleic anhydride. It has also been discovered that the interpolymerization of 1,2-dimethoxyethylene with maleic anhydride produces a polymeric material in which the mol ratio of 1,2-dimethoxyethylene:maleic anhydride is 1:1.

The invention is illustrated further by means of the following example.

*Example.*—A mixture consisting of 8.81 grams of 1,2-dimethoxyethylene and 9.81 grams of maleic anhydride in 176 grams of benzene containing 0.05 gram of alpha, alpha'-azo-diisobutyronitrile was heated for four hours at 75° C. The solution became cloudy after about 15 minutes and a solid polymeric material precipitate. After additional polymer had formed, the solid was removed by filtration. This polymeric material had a stick temperature of 250° C. (stick temperature being the temperature at which the polymer leaves a wet molten trail as it is stroked with moderate pressure across a clean portion of a hot copper surface). The inherent viscosity of a ½% solution of the polymer in dimethylformamide was 1.48. The dimethoxyethylene/maleic anhydride mol ratio as calculated from the carbon and hydrogen content of the polymer was 1:1. Other properties of the polymer are set forth in the following table.

*Properties of 1,2-dimethoxyethylene/maleic anhydride interpolymer*

| | |
|---|---|
| Water absorption | 1.05%. |
| Heat dist. temp. (264 p. s. i. load) | 160° C. |
| Flex. strength (p. s. i.) | 3,880. |
| Flex. modulus (p. s. i.) | |
| 38° | $3.2 \times 10^5$. |
| 51° | $3.28 \times 10^5$. |
| 75° | $3.07 \times 10^5$. |
| 100° | $2.79 \times 10^5$. |
| 143° | $1.75 \times 10^5$. |
| Hardness (Rockwell) | M–106. |
| Compression mold. temp | film, 225°/3000 p. s. i. bar, 240°/3000 p. s. i. |

It is to be understood that the foregoing example is illustrative only since numerous modifications of the process hereinabove described will occur to those who are skilled in the art. The interpolymerization actually occurs spontaneously in the presence of inert diluents. When the reaction takes place at ordinary temperatures, however, it is relatively slow and therefore temperatures in the range of about 30°–100° are generally employed. A unique and highly significant observation is that the interpolymerization of 1,2-dimethoxyethylene with maleic anhydride takes place without added catalyst in the presence of air, in fact, the mixture is suitable for use in air-drying compositions.

Any substance which generates free radicals under the reaction conditions may be employed as a catalyst for the interpolymerization. Suitable catalysts include not only the azo compounds but also organic peroxy compounds such as diacyl peroxides, dialkyl peroxides, organic hydroperoxides, peresters (including tertiary butyl per esters), etc.

The interpolymer obtained by the process of this invention is useful in numerous applications such as coating compositions, molded products, etc.

I claim:

1. 1,2-dimethoxyethylene/maleic anhydride interpolymer.

2. An interpolymer of 1,2-dimethoxyethylene with maleic anhydride in which the mol ratio of these compounds is 1:1, said interpolymer having a stick temperature of about 250° C.

References Cited in the file of this patent

UNITED STATES PATENTS

| 2,047,398 | Voss et al. | July 14, 1936 |
| 2,479,068 | Gresham | Aug. 16, 1949 |
| 2,526,743 | Gresham | Oct. 24, 1950 |